United States Patent Office 3,375,130
Patented Mar. 26, 1968

3,375,130
ADHESION OF POLYOLEFINS TO HYDROPHILIC SUBSTANCES
William O. Kincannon, Jr., Wilmington, Del., assignor to Hercules Incorporated, a corporation of Delaware
No Drawing. Filed June 25, 1964, Ser. No. 378,056
5 Claims. (Cl. 117—126)

ABSTRACT OF THE DISCLOSURE

The bonding of a molten polyolefin to a hydrophilic substrate of the group consisting of cellulose and glass is effected by first forming a thin film of a mixture of polymerized terpene resin and a reaction product of maleic anhydride and a polymerized terpene resin on the surface of said substrate prior to bonding.

---

This invention relates to the bonding of olefin polymers to the surface of hydrophilic substances, and more particularly it relates to a method of improving adhesion of such olefin polymers as polyethylene and polypropylene and copolymers in which ethylene or propylene are essential monomer components to solid hydrophilic substrates such as woven or nonwoven fabrics and films such as paper, cloth, glass fiber cloth, cellophane, glassine paper, and similar materials.

In accordance with the present invention, the hydrophilic surface to which adhesion is desired is coated with a mixture of (a) a polymerized terpene resin containing polymers of the formula $(C_{10}H_{16})_n$ where $n$ is a whole number from 2 to 10 and (b) a product of reaction of maleic anhydride therewith as a bonding agent in an amount sufficient to deposit a thin layer on the surface to which the polyolefin film is to be laminated and then extruding a film of hot polyolefin on said surface and cooling the resulting laminate. This mixture is referred to hereinafter as a bonding agent.

The bonding agent of this invention is thus a mixture of a polymerized terpene containing polymers of the formula $(C_{10}H_{16})_n$ where $n$ is a whole number from 2 to 10 and a maleic anhydride reaction product thereof and is readily produced by heating the said polymerized terpene with maleic anhydride at a temperature in the range of about 150 to 275° C. until an aqueous alkali dispersible product is formed. The maleic anhydride condenses with the polymerized terpene forming an acidic resin which is a solid amber-colored resin differing in physical properties only slightly from the polymerized terpene resin from which it is formed.

The thermal reaction of polymerized terpenes with maleic anhydride is known in U.S. 2,321,750. In this reaction the polymerized terpenes of the formula $(C_{10}H_{16})_2$ are first to react and those of the formula $(C_{10}H_{16})_n$ where $n$ is greater than 2 react more slowly. The amount of maleic anhydride reacted with the polymerized terpene in accordance with the present invention is in the range of about 2 to about 8% of the weight of the polymerized terpene. The preferred amount is in the range of about 2 to about 3% and is suitably 2.5%. Eight percent maleic anhydride based on 100 parts polymerized terpene will react with as much as 22.3% dipolymer in the polymerized terpene and with lesser percentages of higher molecular weight polymers. Two percent maleic anhydride will react with about 5.5% dipolymer in the polymerized terpene. The mixture of polymerized terpene and the product of reaction of 2 to 8% of maleic anhydride will have an acid number varying from about 22.5 to about 90 depending on the amount of maleic anhydride reacted.

The same process as used for reacting dipolymer with maleic anhydride is applied to the higher polymerized terpenes to produce the maleic anhydride treated polymerized terpene of the present invention. The dipolymer is the most reactive of the polyterpenes, and the maleic anhydride treated polymerized terpene of this invention will contain at least some (at least 5%) of this maleic anhydride-diterpene resin adduct. It will also contain products of reaction of maleic anhydride with the higher polyterpene resins when the amount of maleic anhydride reacted is in excess of that required to combine with the diterpene resin. The reaction product of equimolecular amounts of liquid diterpene resin, e.g. dipolymer, and maleic anhydride when mixed with solid polymerized terpene of high melting point (low in dipolymer content) in amounts not over about 10% of such dipolymer-maleic anhydride resin so as to contain about 90% of such polymerized terpene resin is an equivalent bonding resin within the scope of this invention. The maleic anhydride treated polymerized terpene more particularly resembles in some respects the resin produced from a maleic anhydride treated polyterpene resin having an average value of $n$ in the range of 2 to 4 and containing small amounts, from about 5% up to about 10% of dipolymer. It is thus within the scope of this invention to also use a blend of high-melting polymerized terpene resins and the maleic anhydride-polymerized terpene adduct as the bonding agent of this invention.

The polymerized terpenes from which the bonding agents of this invention are produced are pale amber transparent thermoplastic polyterpene hydrocarbon resins of the type formula $(C_{10}H_{16})_n$ where $n$ is 2 to 10 and contain dipolymer, in which $n$ of the formula is 2, in amounts not exceeding about 10%. They are characterized by ring and ball softening points (SP) ranging up to about 135° C.; they are soluble in most organic solvents and are of good color stability. Commercially available polymerized terpenes have softening points (ASTM ring/ball method EZ8–51T) in the range of 10 to 135° C. Terpenes which give these resins are: turpentine or terpene cuts, which contain such terpenes as $\alpha$ and $\beta$-pinenes, dipentene, $\alpha$-terpinene, 3-carene, alloöcimene, and myrcene. Some terpene derivatives, such as terpene alcohols, on pyrolysis yield these terpenes which subsequently polymerize to the same polymerized terpenes as are obtainable from the terpene hydrocarbons themselves, and thus the source of the terpene hydrocarbons is immaterial. The polymerized terpenes are produced by heating a terpene at temperatures above its boiling point, but below the pyrolysis temperature in the absence of a catalyst, or at low temperatures, with a catalyst. The polymerizations of the terpenes with catalysts such as $BF_3$, $AlCl_3$, $H_2SO_4$, $H_3PO_4$, clays, and acidic resins are all known in the art and the use of temperatures from $-10$ to $+20°$ C. for this catalytic reaction are known, depending on the catalyst used. The polymerized terpenes contain a mixture of polymers of formula $(C_{10}H_{16})_n$ in which $n$ varies from 2 to 10. The dipolymer, in which $n$ equals 2, can be distilled off when present in excess so as to obtain a polyterpene resin having a higher average molecular weight and still containing 5 to 10% dipolymer.

The bonding agent of this invention is used either as an aqueous emulsion or in solution in an organic solvent. To produce a suitable emulsion the resin which is a mixture of polymerized terpene and the adduct of maleic anhydride with the polymerized terpene is neutralized with hot aqueous caustic such as sodium or potassium hydroxide. If desired, the carbonates may be used in place of the hydroxides. A suitable method is the gradual addition of 20% potassium hydroxide solution to a molten stirred mixture of the polymerized terpene and maleic anhydride adduct thereof until the mixture is neutralized. This neutralized mixture is then heated at 100 to 150° C. until a uniform emulsified concentrate of about 40% solids is obtained. If desired, additional emulsifying agents up to about 10% by weight of the solids may be added. For instance, a rosin soap may be used. When rosin soap is used, the rosin and the mixture of polymerized terpene and maleic anhydride adduct thereof may be blended and neutralized with caustic to produce a suitable emulsion containing not more than 10% rosin based on the solids.

When the mixture of polymerized terpene and maleic anhydride adduct thereof is used in solution, such solvents as toluene, xylene, heptane, acetone, or propylene dichloride may be used as diluents. The concentration of the solution will be in the range of 1 to 10%.

The mixture of polymerized terpene and maleic anhydride adduct thereof is applied to the surface to which the polyolefin is to be bonded by spraying an aqueous emulsion or a solution of the bonding agent on the surface and drying so as to leave a thin film on the surface to be bonded. Likewise, the bonding agent can be applied by dipping the material to be bonded in an emulsion or solution of the bonding agent. The thermoplastic polyolefin resin is extruded in the molten state onto the surface in the manner well known in the art.

The use of the polymerized terpene admixed with maleic anhydride adduct thereof for improving adhesion of the polyolefin resins to hydrophilic surfaces is illustrated by the following examples.

*Example 1*

Bleached kraft 42-pound butcher paper was treated in a size press with an aqueous emulsion of 1.5% solids and one of 7.5% solids in which the solids consisted of 90% of a mixture of polymerized turpentine which had been reacted with 2.5% of its weight of maleic anhydride and 10% of potassium rosinate all in a mildly alkaline aqueous emulsion. The resulting kraft paper after drying was found to be coated at the rate of 0.1 and 0.48 pound of bonding agent of this invention per 3,000 sq. feet of paper. The thoroughly dried paper was wound up on a roll as usual and coated in an extrusion coating machine with a ¾-mil film of low density polyethylene (Alathon 16—reg. trademark) at 620° F. at a rate of 500 feet per minute and passed over a chill roll at 70 to 75° F. The resulting adhesion was measured in comparison with kraft paper coated with polyethylene without the bonding agent of this invention. The results were as follows:

| Sample | Lb. Bonding Agent per 3,000 Sq. Ft. | Adhesion, Lb. per In. |
|---|---|---|
| A | 0 | 0.30–0.19 |
| B | 0.1 | 0.50–0.44 |
| C | 0.48 | 0.61–0.47 |

The adhesion in Sample A was insufficient to cause tearing of the fibers from the paper, but was sufficient to cause tearing of fibers in Samples B and C.

*Example 2*

Glassine paper was coated with a 4% toluene solution of polymerized turpentine modified by heating with 2.5% maleic anhydride at 200° C. and dried. The amount of bonding agent placed on the glassine paper was 0.03 pound per 3,000 sq. feet. This paper was then coated with a 1-mil film of high density polypropylene flowed on as a melt at 570° F. at a rate of 100 feet per minute. The adhesion of the polypropylene to untreated glassine was 0.04 to 0.065 pound per inch. The adhesion of the polypropylene to the treated glassine paper was 0.54 to 1.25 pounds per inch.

*Example 3*

Glass fiber cloth was spray coated with a 4% toluene solution of the polymerized turpentine modified by heating with 2.5% maleic anhydride at 200° C. and dried. The treated glass cloth was then coated by melt extrusion of low density polyethylene. The adhesion was about 5 times as great as to untreated glass cloth.

*Example 4*

Cellophane was sprayed with a 2% emulsion of polymerized turpentine modified by reaction with 3% maleic anhydride and emulsified by 10% its weight of rosin soap (potassium soap). The cellophane was then coated with a 1-mil coating of polyethylene by melt extrusion at 570° F. The adhesion to the cellophane was about 6 times as great as the adhesion of polyethylene to untreated cellophane.

The polymerized turpentine used in the above examples was made by the noncatalytic polymerization of wood turpentine (80% α-pinene, 5% other bicyclic terpenes, 15% monocyclic terpenes). It contained polymers in the range of 2 to 10 terpene units per molecule and had the following properties: melting point 75° C. (ring and ball), color N (rosin scale), and contained about 25% dipolymer and tripolymer combined.

The polymerized terpene resins unmodified with maleic anhydride have little or no activity for improving adhesion of the polyolefins to hydrophilic surfaces, but as little as 2% maleic anhydride modifies the polymerized terpene so that substantial adhesive power is created. More than 3% maleic anhydride in the modified polymerized terpene improves the adhesion properties only slightly and is not necessary for best results.

The process of this invention is applicable to all commercial polymers of ethylene and propylene and copolymers of ethylene and propylene which can be extruded as a melt and form a solid film on cooling. This applies to both high density and low density polymers and crystalline or amorphous polymers regardless of their method of production, provided they are flowable as a molten plastic.

What I claim and desire to protect by Letters Patent is:

1. In a process for bonding a molten thermoplastic high molecular weight polyolefin of the group consisting of polyethylene, polypropylene and copolymers of ethylene and propylene to a hydrophilic solid substrate consisting of fabrics and films of a hydrophilic substance of the group consisting of cellulose and glass, the step prior to bonding which comprises coating said solid substrate with a bonding agent in a sufficient amount to provide a thin film of said bonding agent on the surface of said substrate to be bonded to the polyolefin, said bonding agent consisting essentially of a mixture of (a) 90–95% polymerized terpene resin containing a mixture of polymers of the formula $(C_{10}H_{16})_n$ where $n$ is a whole number from 2 to 10 and (b) 10–5% of a product of reaction of maleic anhydride and a polymer of said formula.

2. The process of claim 1 in which the product of reaction of maleic anhydride and polymerized terpene is a maleic anhydride-dipolymer adduct.

3. The process of claim 2 in which the bonding agent is the product of thermal reaction of (a) polymerized terpene hydrocarbon resin having the formula $(C_{10}H_{16})_n$, where $n$ is a whole number in the range of 2 to 10 and having a dipolymer, $(C_{10}H_{16})_2$, content in an amount not exceeding 10% of the polymerized terpene, and (b) maleic anhydride in an amount in the range of 2 to 8% of the weight of the polymerized terpene.

4. The process of claim 1 in which the bonding agent is applied as an aqueous emulsion.

5. The process of claim 1 in which the bonding agent is applied as an organic solvent solution.

(References on following page)

References Cited

UNITED STATES PATENTS

| | | | |
|---|---|---|---|
| 1,992,249 | 2/1935 | Snyder | 161—232 |
| 2,321,750 | 6/1943 | Humphrey | 260—78 |
| 2,368,782 | 2/1945 | Rummelsburg | 260—9 |
| 2,383,399 | 8/1945 | Lundguist | 260—78 |
| 2,663,652 | 12/1953 | Railing | 117—21 |
| 2,977,246 | 3/1961 | Fisher et al. | 117—76 |
| 3,163,617 | 12/1964 | Nussle | 260—28.5 |
| 3,193,449 | 7/1965 | Aldrich et al. | 162—180 |
| 3,269,860 | 8/1966 | Richardson et al. | 117—155 |
| 3,269,890 | 8/1966 | Gaertner | 162—164 |

OTHER REFERENCES

Armitage, F.: "Terpenes in the Paint and Varnish Industry," volume IX, number 104, Paint Technology, pages 169 and 170 (1944).

WILLIAM D. MARTIN, *Primary Examiner.*

W. D. HERRICK, *Assistant Examiner.*